United States Patent [19]

Klecker et al.

[11] Patent Number: 5,361,650
[45] Date of Patent: Nov. 8, 1994

[54] TRANSMISSION HAVING EXTERNALLY MOUNTED ELECTRONIC CONTROL UNIT

[75] Inventors: Donald L. Klecker, Watertown, Wis.; Bruce Vincent, Kalamazoo, Mich.

[73] Assignee: Eaton Corporation, Cleveland, Ohio

[21] Appl. No.: 21,024

[22] Filed: Feb. 23, 1993

[51] Int. Cl.⁵ ............................................. F16H 57/02
[52] U.S. Cl. ................................ 74/606 R; 174/52.2
[58] Field of Search ..................... 74/606 R; 174/52.2

[56] References Cited

U.S. PATENT DOCUMENTS

| | | | |
|---|---|---|---|
| 4,552,818 | 11/1985 | Wong | 428/447 |
| 4,596,743 | 6/1986 | Brauer et al. | 428/380 |
| 4,636,920 | 1/1987 | Cook et al. | 361/810 |
| 4,707,763 | 11/1987 | Kudo | 361/386 |
| 4,784,019 | 11/1988 | Morscheck | 74/720 |
| 4,895,998 | 1/1990 | Bevington | 174/52.2 |
| 5,109,721 | 5/1992 | Boardman et al. | 74/336 R |
| 5,109,729 | 5/1992 | Boardman et al. | 74/858 |
| 5,185,498 | 2/1993 | Sanftleben et al. | 174/52.2 |
| 5,311,398 | 5/1994 | Schirmer et al. | 361/704 |

OTHER PUBLICATIONS

The Eaton Ceemat (Converter Enhanced Electronically Managed Automatic Transmission) SAE Technical Paper Series 881830 Nov. 7, 1988.

Eaton® Fuller® CEEMAT ™ Transmissions Brochure, Copyright Eaton Corporation, 1991.

*Primary Examiner*—Dirk Wright
*Attorney, Agent, or Firm*—Brooks & Kushman

[57] ABSTRACT

A transmission assembly having an electronic control unit detachably mounted to the exterior of a transmission is disclosed. The transmission assembly comprises the transmission, a cover mounted to the transmission, and a circuit board for controlling the transmission. The circuit board is substantially encased in a potting material, and is detachably fastened by bolts to the cover. The potting material forms a casing around the circuit board, and the casing has a series of ribs adapted for contact with the cover to reduce the transfer of vibrations to the circuit board. The potting material is preferably silicone based, and substantially transparent to permit visual inspection of the electronic components of the circuit board.

14 Claims, 2 Drawing Sheets

TRANSMISSION HAVING EXTERNALLY MOUNTED ELECTRONIC CONTROL UNIT

TECHNICAL FIELD

This invention relates to transmissions for motor vehicles, and more particularly to a transmission having an electronic control unit detachably mounted in a cover assembly to the exterior of the transmission.

BACKGROUND ART

Conventional electronic transmission control systems are known in which sensors detect transmission output speed, engine load, engine speed, selector lever position, and other pertinent operating conditions. A microprocessor in the electronic control unit (ECU) processes the data from these sensors in accordance with a predetermined program and calculates from them signals which are relayed to the transmission to engage a suitable gear. The selected gear is physically engaged by the energization of solenoid valves and the operation of actuators, although the driver may also position the selector lever so as to keep the transmission in low gear for special operating conditions like towing or for engine braking.

The one or more electrical circuit boards which comprise the ECU must be protected from vibration, as well as water, soil, and other contaminants which might interfere with their operation. Depending on the physical location of the ECU within the vehicle, the circuit boards must be protected to a greater or lesser extent. If, for example, the circuit boards are located in the vehicle cab or another location remote from the transmission, it may only be necessary to apply a conformal coat to protect against the effects of humidity. However, if the circuit boards are located on or near the transmission, a conformal coat is largely insufficient to protect against the more rigorous environmental conditions found there.

It has therefore been proposed to mount the circuit boards in a cover adjacent the transmission, and then apply a potting material around the circuit boards to seal the boards from the surrounding environment. This approach was employed, for instance, in early designs of Eaton Corporation's Converter Enhanced Electronically Managed Automatic Transmission (CEEMAT). A problem with potting the circuit boards directly in situ in the transmission cover is that if one of the circuit boards becomes inoperative, the entire unit, including the circuit boards and the control valving section which is frequently integral with the cover, must be replaced because it is impractical to physically gouge the board out of its potted mounting.

SUMMARY OF THE INVENTION

The present invention includes a transmission assembly and a method of equipping a transmission with an electronic control unit. The transmission assembly comprises a transmission, a cover mounted to the housing of the transmission, and a circuit board for controlling the transmission. Before assembly with the cover and the transmission, the circuit board is placed into a mold and a potting material is introduced into the mold. The potting material is then cured so that the circuit board is substantially encased in the potting material prior to its attachment to the transmission. The resulting casing is removed from the mold, and the circuit board is operatively connected to controls of the transmission.

The casing around the circuit board has a series of elastic ribs adapted for contact with the cover. The ribs are preferably elastomeric in order to absorb at least a portion of the vibration to which the circuit boards would otherwise be exposed. The potting material is preferably transparent to allow visual inspection of the electronic components of the circuit board, and is also preferably a silicone based material to withstand the operational temperatures of the transmission. To complete the assembly, the potted circuit board is detachably fastened to the cover so that either the circuit board or the cover can be replaced without loss of the other.

Accordingly, it is an object of the present invention to provide a transmission assembly of the type described above having an electronic control unit which is mounted proximate but externally of the transmission.

Another object of the present invention is to provide a transmission assembly of the type described above having a circuit board that is detachably mounted in the cover.

Another object of the present invention is to provide a transmission assembly of the type described above having a circuit board which is substantially encased in a transparent potting material to facilitate visual inspection of the circuit board.

A more specific object of the present invention is to provide a method of equipping a transmission with an electronic control unit which is encased in a potting material that is readily detachable from the remainder of the transmission to facilitate inspection and repair or replacement.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
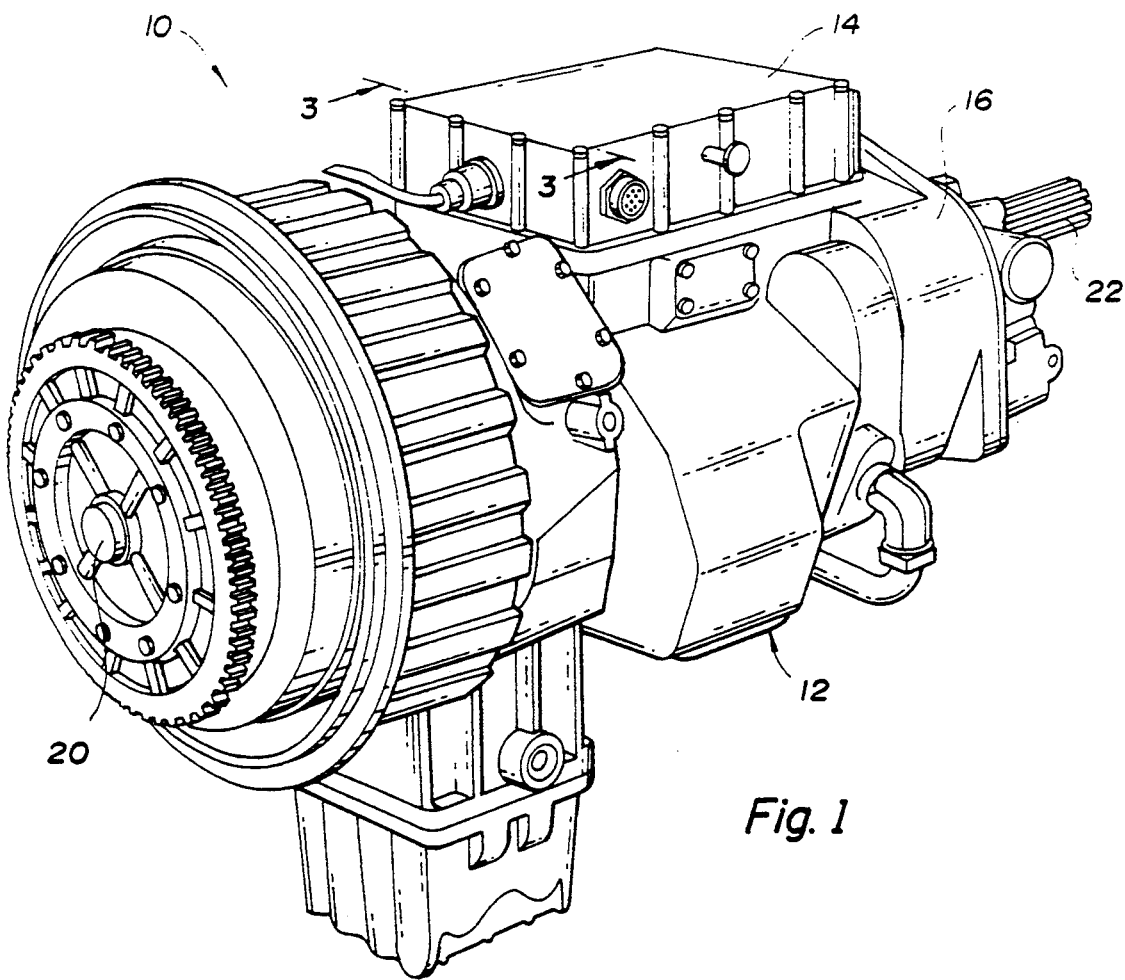
FIG. 1 is a perspective view of a transmission assembly having an externally mounted electronic control unit according to the present invention.
Figure 2:
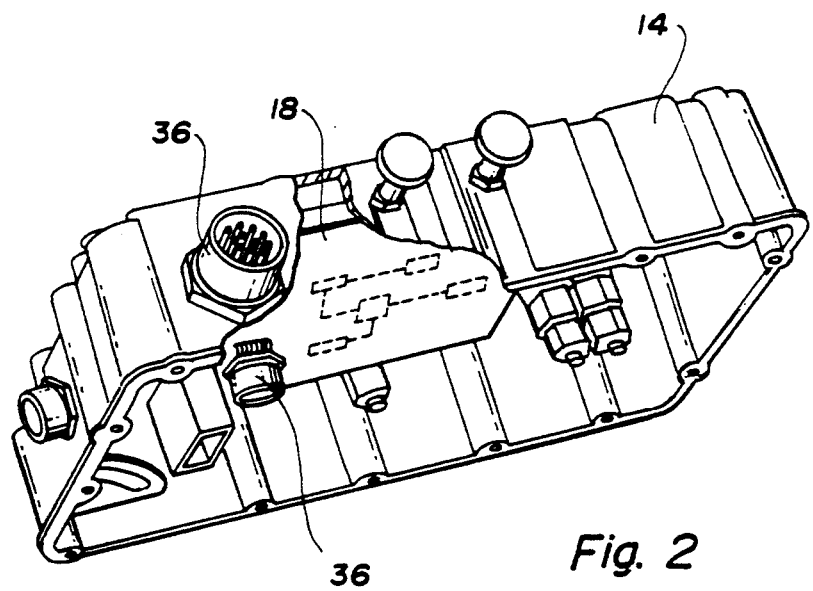
FIG. 2 is a perspective view of the electronic control unit of the transmission assembly and a cover for the electronic control unit.

With reference to the drawings, the preferred embodiments of the present invention will be described. FIGS. 1 and 2 show a transmission assembly 10 which comprises a transmission 12, a cover 14 mounted directly to the transmission housing 16, and at least one circuit board 18 which forms an electronic control unit (ECU) for electronically controlling the transmission. The transmission 12 preferably has a structure as shown and described in U.S. Pat. No. 4,784,019, assigned to the assignee of the present invention and hereby incorporated by reference, and includes any combination of gears and shafts contained in the housing 16. The gears and shafts (not shown) are selectively positionable in any conventional manner, such as by actuators, to selectively establish a particular ratio, from a plurality of possible ratios, between the speed of rotation of an input shaft 20 and the speed of rotation of an output shaft 22.

Because the circuit board 18 is situated proximate the transmission itself, as opposed to being located at a position remote from the transmission, the circuit board must be capable of operating for hundreds of hours in a variety of relatively harsh environments. For instance, the operating temperatures of the transmission may range between −40 degrees C. and 200 degrees C. Furthermore, dirt, oil, water and other potential contaminants often circulate in and around the transmission.

Figure 3:
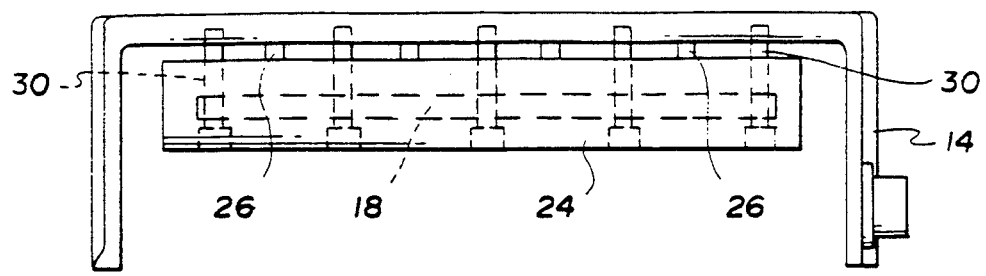
FIG. 3 is a cross-sectional view of the electronic control unit encased in a potting material and the cover taken along line 3—3 in FIG. 1.

As shown in FIG. 3, the circuit board 18 is therefore substantially encased in a potting material to resist intrusion of environmental elements which might otherwise interfere with operation of the circuit board. The potting material forms a casing 24 around the circuit board 18. The casing 24 has a series of ribs 26 adapted for contact with the floor of the cover 14. The ribs 26 are preferably elastomeric, and function to dampen vibrations which might otherwise be tranferred from the transmission through the cover to the circuit board 18. Similarly, the ribs 26 function to resist flexure or twisting of the circuit board 18.

Figure 4:
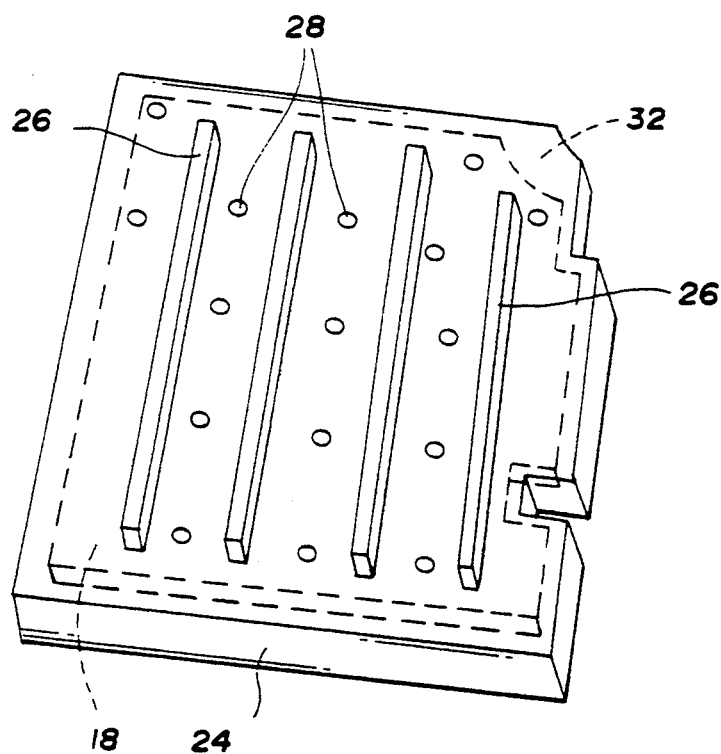
FIG. 4 is a perspective view of the side of the electronic control unit which faces the cover.

As shown in FIG. 4, the casing 24 has an arrangement of holes 28 therethrough through which bolts 30 may extend. The bolts 30 extend through the circuit board 18 and the casing 24, and into the cover 14, to detachably fasten the casing and the circuit board to the cover. It should be appreciated that suitable fastening means other than the bolts 30 may be used to detachably fasten the circuit board 18 to the cover 14.

Figure 5:
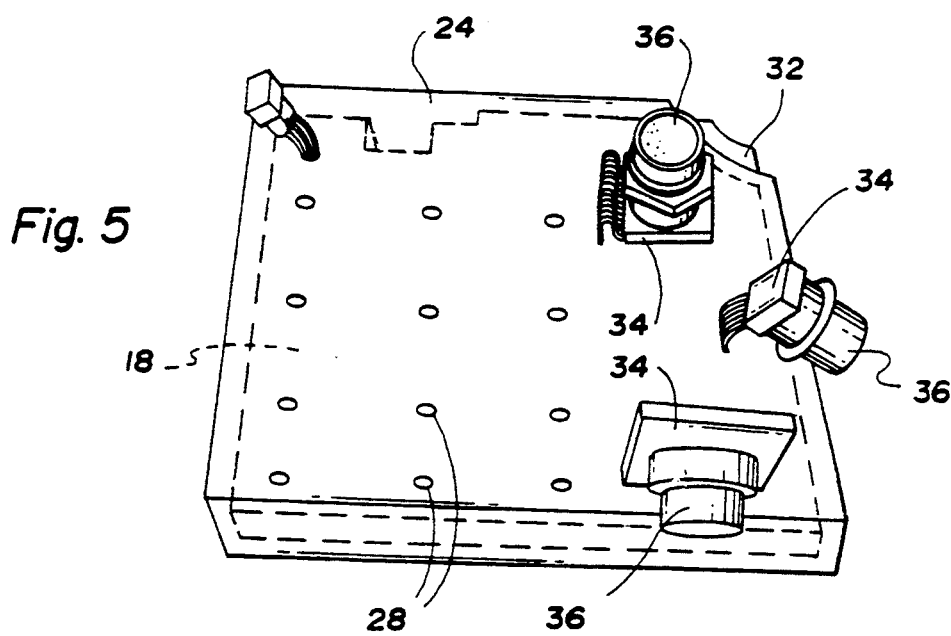
FIG. 5 is a perspective view of the other side of the electronic control unit which faces the transmission.

As shown in FIG. 5, the casing 24 also has a groove 32 through which a Hall effect sensor may sweep without interference. Base portions 34 of connectors 36, through which the circuit board 18 receives power and communicates with the sensors and the remainder of the transmission, are preferably also substantially encased in potting material, although they need not necessarily be encased in the casing 24.

It is desirable that the cured potting compound retain a flexibility and resiliency sufficient to minimize any force from being imparted to the electronic circuitry of the board 18, and yet not crack in operation. Likewise, the potting material is preferably substantially transparent or at least translucent, even after exposure to operational conditions, so that the circuit board 18 can be visually inspected for problems to complement any electronic diagnostics. It has been determined that a clear, silicone based potting material best satisfies these criteria. For example, Sylgard 160, available from Dow Corning, or SC-267 available from Thermoset Plastics, Inc. of Indianapolis, Ind. are both suitable for the present application. Another alternative is Emerson & Cuming Stycast 2754, an epoxy modified rubber which is black in color. It should be appreciated, however, that any other potting material sufficient for the described application, such as a urethane based potting material, may also be used.

The present invention also provides a method of equipping a transmission with an electronic control unit. The method comprises initially placing a circuit board into a mold or fixture. The mold can be of any shape which produced the required casing, and is preferably made from ABS Cycolac, available from Borg Warner. Thereafter, an uncured silicone or urethane based potting resin is introduced into the mold. A mold release agent such as Polyester Parfilm, available from Price Driscoll Corporation of Farmingdale, N.Y., may first be sprayed into the mold prior to introducing the potting material to facilitate the subsequent removal of the potting material from the mold.

After the potting material is introduced into the mold, it is cured at about 150 degrees Fahrenheit for between about 170 and 190 minutes so that the circuit board is substantially encased in the potting material. After the potting material has cured, the potted circuit board is removed from the mold, and operatively connected to controls of the transmission. The circuit board is then fastened, such as by bolting or screwing, directly to a transmission cover. The cover in turn is attached to the exterior of the transmission housing.

Because the circuit board and its casing can be removed from the main transmission and the cover, a new circuit board and casing can be substituted if necessary without throwing out the valving associated with the cover. The detachability of the circuit board is particularly important since there are many electrical components on the back of the circuit board which would be impossible to access if the circuit board was permanently mounted to the cover. As an alternative to throwing out the entire circuit board, an individual electrical component on the board can be replaced by removing part of the potting compound, replacing the component and then resealing the board where the component was replaced with additional potting compound.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A transmission assembly comprising:
   a transmission adapted to selectively establish a ratio between the speed of rotation of an input shaft and the speed of rotation of an output shaft;
   a cover mounted to the housing of the transmission;
   a circuit board for controlling the transmission, the circuit board being substantially encased in a potting material to form a casing around the circuit board; and
   fastening means for detachably fastening the casing to the cover.

2. The transmission of claim 1 wherein the casing has at least one rib adapted for contact with the cover.

3. The transmission of claim 1 wherein the potting material is substantially transparent.

4. The transmission of claim 1 wherein the potting material is silicone based.

5. The transmission of claim 1 wherein the potting material is urethane based.

6. A method of equipping a transmission with an electronic control unit, the method comprising
   placing a circuit board into a mold;
   introducing a potting material into the mold;
   curing the potting material so that the circuit board is substantially encased in the potting material;
   removing the potted circuit board from the mold; and operatively connecting the circuit board to controls of the transmission.

7. The method of claim 6 further comprising fastening the potted circuit board to a cover.

8. The method of claim 7 wherein the fastening step comprising bolting.

9. The method of claim 7 wherein the fastening step comprises extending a bolt through the potting material so that the bolt engages the circuit board.

10. The method of claim 7 further comprising mounting the cover to the exterior of the transmission.

11. The method of claim 6 wherein the potting material is substantially transparent.

12. The method of claim 6 wherein the potting material is silicone based.

13. The method of claim 6 wherein the potting compound is urethane based.

14. The method of claim 6 further comprising spraying a mold release agent into the mold prior to introducing the potting material.

* * * * *